United States Patent
Piermarioli et al.

(10) Patent No.: US 10,035,542 B2
(45) Date of Patent: Jul. 31, 2018

(54) UNIT WITH LONGITUDINAL BEAM AND FRONT PLATE FOR A MOTOR-VEHICLE STRUCTURE

(71) Applicant: FCA Italy S.p.A., Turin (IT)

(72) Inventors: Giorgio Piermarioli, Turin (IT); Paolo Barutello, Turin (IT); Luigi Laera, Turin (IT)

(73) Assignee: FCA Italy S.p.A., Turin (IT)

(*) Notice: Subject to any disclaimer, the term of this patent is extended or adjusted under 35 U.S.C. 154(b) by 0 days.

(21) Appl. No.: 15/590,522

(22) Filed: May 9, 2017

(65) Prior Publication Data

US 2018/0001933 A1    Jan. 4, 2018

(30) Foreign Application Priority Data

Jul. 1, 2016    (EP) .................................... 16177597

(51) Int. Cl.
*B62D 25/08* (2006.01)
*B62D 21/15* (2006.01)
(Continued)

(52) U.S. Cl.
CPC ............ *B62D 21/152* (2013.01); *B60R 19/34* (2013.01); *B62D 25/08* (2013.01); *B62D 27/023* (2013.01);
(Continued)

(58) Field of Classification Search
CPC ...... B60R 19/34; B62D 21/152; B62D 27/03; B62D 65/02; B62D 25/08
(Continued)

(56) References Cited

U.S. PATENT DOCUMENTS

| 4,190,276 A | * | 2/1980 | Hirano | .................... B60R 19/34 188/376 |
| 9,580,106 B2 | * | 2/2017 | Yalamanchili | ....... B62D 21/152 |
| 2017/0151920 A1 | * | 6/2017 | Duffe | .................... B60R 19/023 |

FOREIGN PATENT DOCUMENTS

| CN | 104 828 149 | 8/2015 |
| DE | 10 135 158 | 12/2006 |

(Continued)

OTHER PUBLICATIONS

Search Report for EP 16177597, dated Jan. 11, 2017, 5 pages.

*Primary Examiner* — Dennis H Pedder
(74) *Attorney, Agent, or Firm* — Nixon & Vanderhye P.C.

(57) ABSTRACT

Unit with longitudinal beam and front plate for a motor-vehicle front structure, comprising a longitudinal beam in the form of a hollow profile and a front plate rigidly connected to a front end of said longitudinal beam. The longitudinal beam comprises a first beam element defining an upper wall, a lower wall and a first side wall of the longitudinal beam and a second beam element having a wall defining a second side wall of the longitudinal beam. The front plate has a rear face facing towards the longitudinal beam to which there are welded a first flange and a second flange which are separate from each other, for connecting the front end of the longitudinal beam. The first flange is a C-shaped bracket with an upper wall, a lower wall and a side wall respectively welded to the upper wall, the lower wall and the first side wall defined by said first beam element. The second flange is an L-shaped bracket, with a first wall welded to the rear face of the front plate and a second wall facing towards said second side wall defined by said second beam element. The above mentioned welds are electric spot welds. The two flanges may have different thickness.

11 Claims, 7 Drawing Sheets

Figure 1:
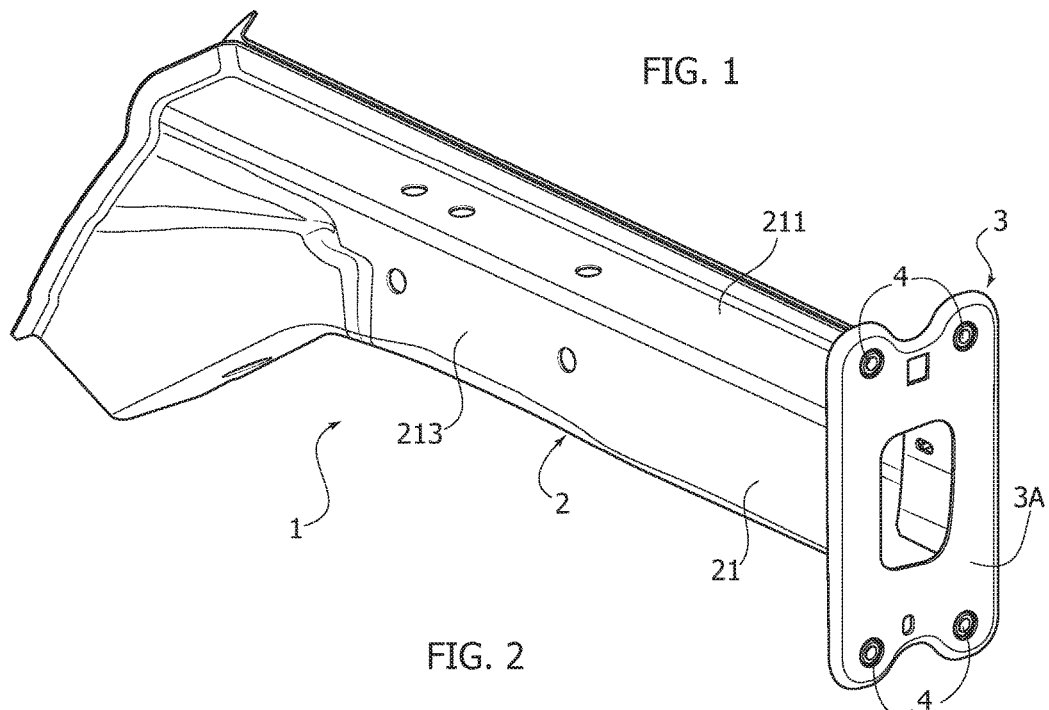

(51) Int. Cl.
  *B62D 27/02* (2006.01)
  *B60R 19/34* (2006.01)
  *B62D 65/02* (2006.01)
  B60R 19/02 (2006.01)
  B21D 53/88 (2006.01)

(52) U.S. Cl.
  CPC .............. *B62D 65/02* (2013.01); *B21D 53/88* (2013.01); *B60R 19/02* (2013.01); *B62D 27/02* (2013.01)

(58) Field of Classification Search
  USPC .......................... 296/187.09, 187.1; 293/134
  See application file for complete search history.

(56) References Cited

FOREIGN PATENT DOCUMENTS

| | | |
|---|---|---|
| DE | 10 2005 054250 | 5/2007 |
| DE | 10 2008 021076 | 10/2009 |
| DE | 10 2010 026707 | 1/2012 |
| JP | 2008-189233 | 8/2008 |

\* cited by examiner

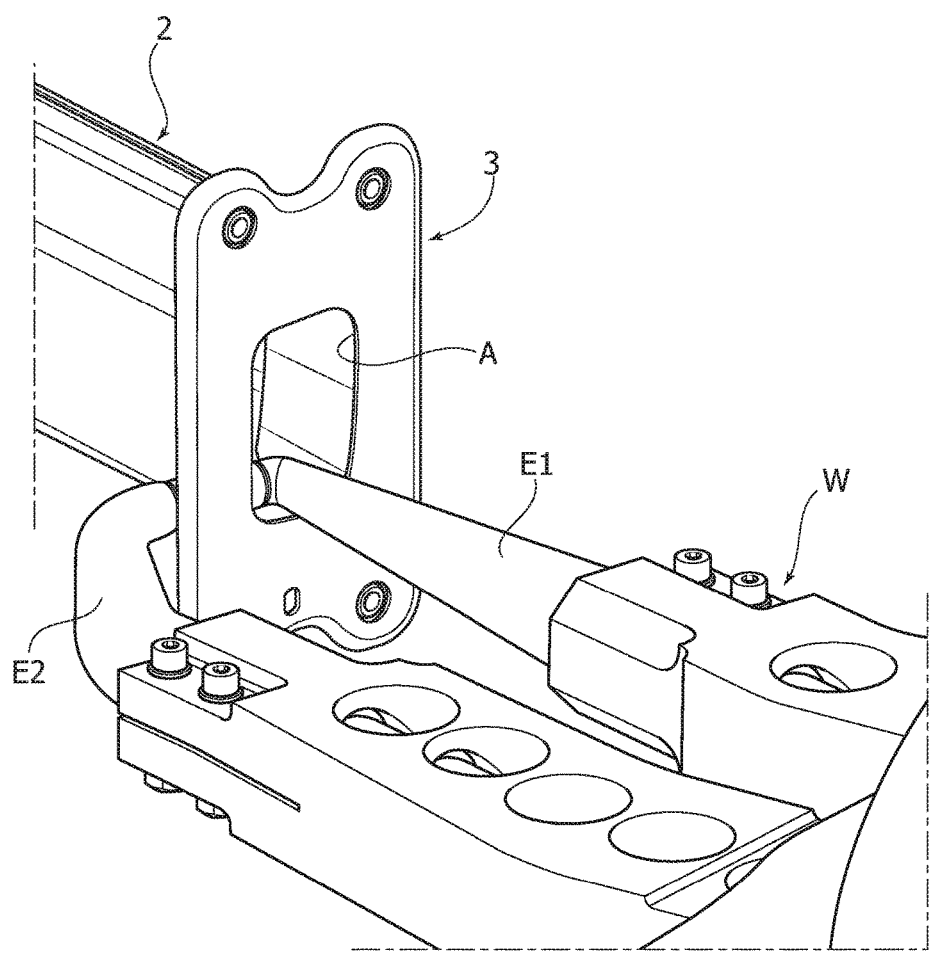

UNIT WITH LONGITUDINAL BEAM AND FRONT PLATE FOR A MOTOR-VEHICLE STRUCTURE

This application claims priority to EP Patent Application No. 16177597.8 filed 1 Jul. 2016, the entire contents of which is hereby incorporated by reference.

FIELD OF THE INVENTION

The present invention relates to a unit with longitudinal beam and front plate for a motor-vehicle front structure, of the type comprising a longitudinal beam in the form of a hollow profile and a front plate rigidly connected to a front end of the longitudinal beam.

A front structure of a motor-vehicle comprises a pair of units of the above indicated type. The front plates of the two units are used for connection of the ends of a front cross-member of the motor-vehicle structure, typically with the interposition of so-called "crash-box" structures, adapted to be deformed so as to absorb energy in the case of a front impact of the motor-vehicle.

PRIOR ART

According to the conventional art, the connection between the front end of the longitudinal beam and the above mentioned front plate is carried out by bringing the front end surface of the beam in contact with the rear face of the front plate and by carrying out a number of welding beads, for example by laser welding, along the edge of the beam in contact with the front plate. In general, this operation requires a preliminary cutting operation of the beam, which for example is carried out by a laser beam, in order to define a front end surface which is planar within a relatively narrow tolerance range, so as to ensure the required strength of the subsequent welds which are provided for connecting the front plate to the beam.

Other solutions have also been proposed for obtaining structures of this type (see for example DE 10 135 158 B4, DE 10 2010 026707 A1, DE 10 2005 054 250 A1), which are mainly aimed to ensure that a stable connection is obtained notwithstanding the variations of dimensions due to the manufacturing tolerances.

However, none of the solutions which have been proposed here-to-fore have reached a satisfactory compromise between the different needs of simplicity of manufacture, precision of assembling and high strength of the connection thus obtained.

OBJECT OF THE INVENTION

The object of the present invention is that of providing a unit with longitudinal beam and front plate of the type indicated at the beginning of the present description which is inexpensive to manufacture, enables a simple and reliable connection of the front plate to the longitudinal beam to be obtained, notwithstanding the variations of dimensions due to the manufacturing tolerances, and so as to provide a connection having an elevated mechanical strength.

SUMMARY OF THE INVENTION

In view of achieving the above mentioned object, the invention provides a unit with longitudinal beam and front plate, for a motor-vehicle structure, comprising a longitudinal beam in the form of a hollow profile and a front plate rigidly connected to a front end of the longitudinal beam, said unit being characterized in that:

said longitudinal beam comprises a first beam element, defining a front wall, a lower wall and a first side wall of the longitudinal beam, and a second beam element, having a wall defining a second side wall of the longitudinal beam, said front plate has a rear face facing towards the longitudinal beam to which first and second flanges are welded, which are separate from each other, for connection of the front end of the longitudinal beam, said first flange is a C-shaped bracket, with an upper wall, a lower wall and a side wall respectively welded to said upper wall, said lower wall and said first side wall defined by said first beam element, the upper, lower and side walls of said first flange have respective bent extensions which are welded to the rear face of said front plate, and said second flange is a L-shaped bracket, with a first wall welded to the rear face of said front plate and a second wall welded to said second side wall defined by said second beam element.

In a preferred embodiment, at least one of said first beam element and said second beam element has upper and lower longitudinal flanges welded to the other beam element. The two beam elements are arranged outside of said first and second flanges. Furthermore, the front plate has an aperture which is arranged within the area enclosed in-between said first and second flanges. Also in the case of the preferred embodiment, the above mentioned second wall of the second flange has at least one slot elongated in a direction orthogonal to the plane of the front plate and adapted to loosely receive therein a bent tab of said second beam element.

The invention also provides a method for assembling the unit with longitudinal beam and front plate which has been described above. This method comprises the following steps:

providing said front plate with said first and second flanges welded to its rear face, positioning said first beam element with one of its ends adjacent to the rear face of the front plate and its upper, lower, and side walls in contact with the outer surfaces of said upper, lower and side walls of said first C-shaped flange, positioning said second beam element with one of its ends adjacent to the rear face of the front plate and its wall in contact with the outer surface of said second wall of said L-shaped second flange, by adjusting the position of said second beam element with respect to said front plate and with respect to said first beam element in the direction orthogonal to the front plate, welding said first and second beam elements to each other, and welding the upper, lower and side walls of said first beam element to the upper, lower and side walls of said first flange and welding the wall of said second beam element to said second wall of said second flange.

According to the preferred embodiment, the above mentioned welding operations are carried out by means of spot electric welds. The aperture formed in the front plate is configured to enable one electrode of an electric spot welding head to reach the inner surface of the walls of said first and second flanges when welding of the two beam elements to the first and second flanges carried by the front plate is to be carried out.

An important advantage of the above described structure lies in that the assembling operations can be carried out in a simple manner and with no additional costs, while ensuring that a reliable connection is obtained notwithstanding the variations of dimensions due to the manufacturing tolerances. All the connections can be carried out by means of spot electric welds, with resulting advantages of reduction in the manufacturing costs and reliability of the connection thus obtained.

A further important advantage of the present invention lies in that the first and second flanges carried by the front plate can be made, if this is preferred, also with metal sheets of different thickness. For example, in the preferred embodiment, the first C-shaped flange is arranged on the side of the beam facing towards the engine compartment and has a lower thickness relative to the thickness of the second L-shaped flange.

DETAILED DESCRIPTION OF A PREFERRED EMBODIMENT

Figure 2:
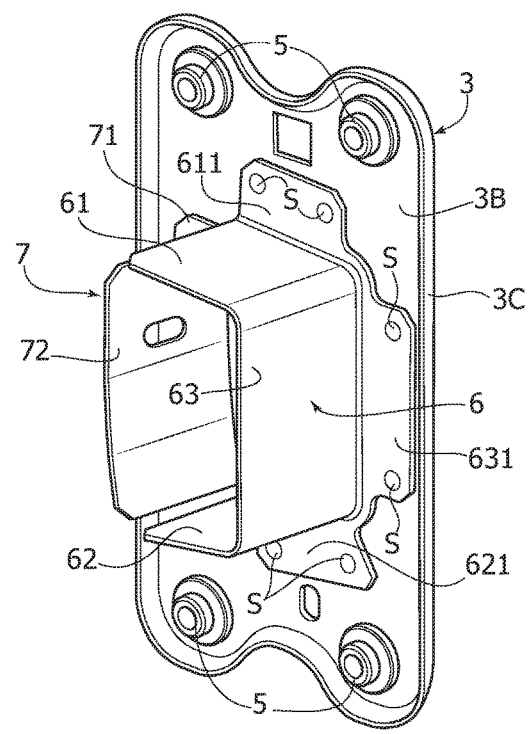
Figure 3:
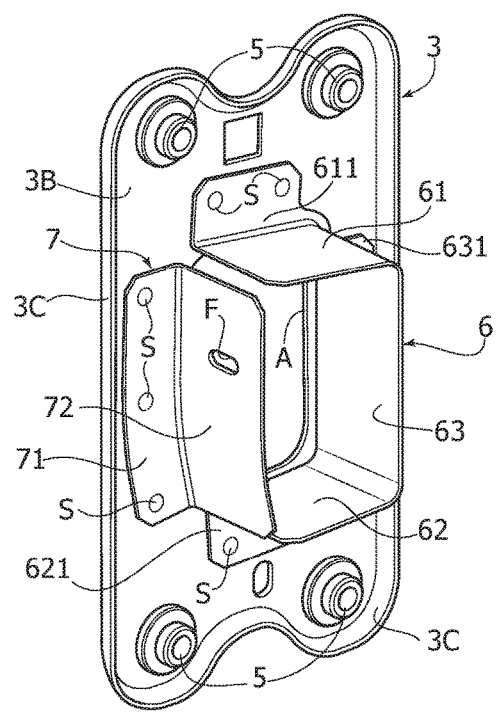
Figure 4:
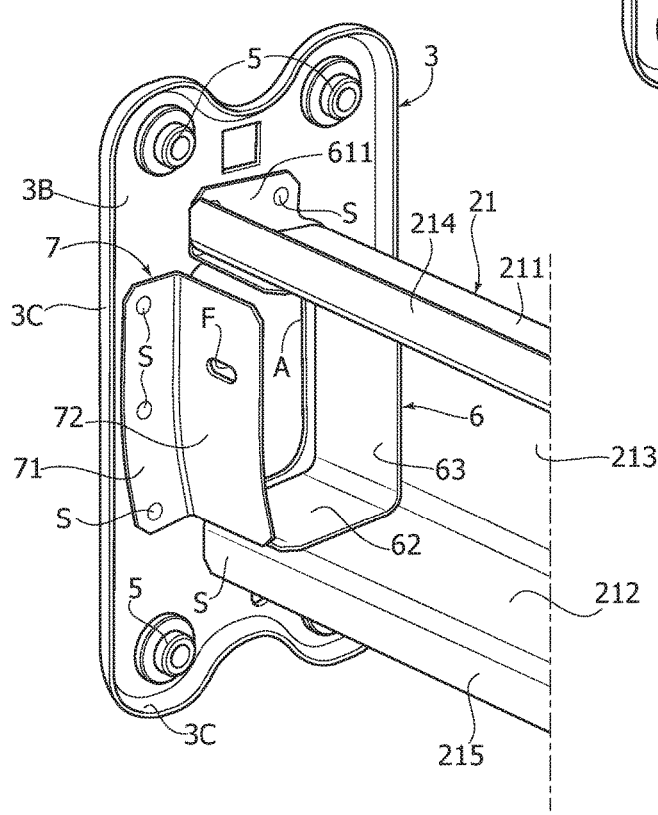
Figure 5:
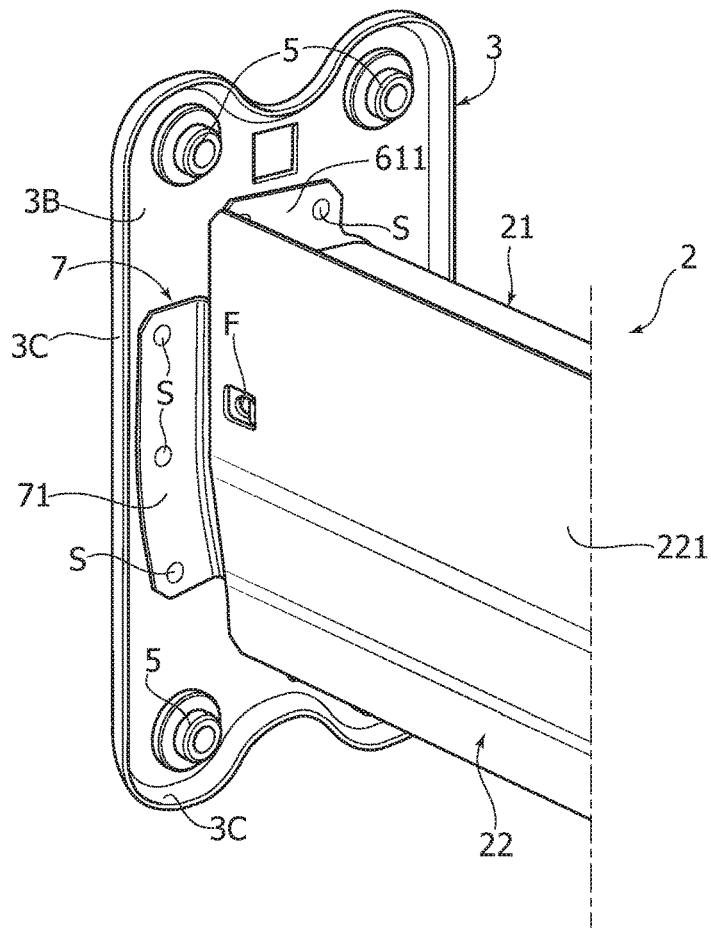
Figure 6:
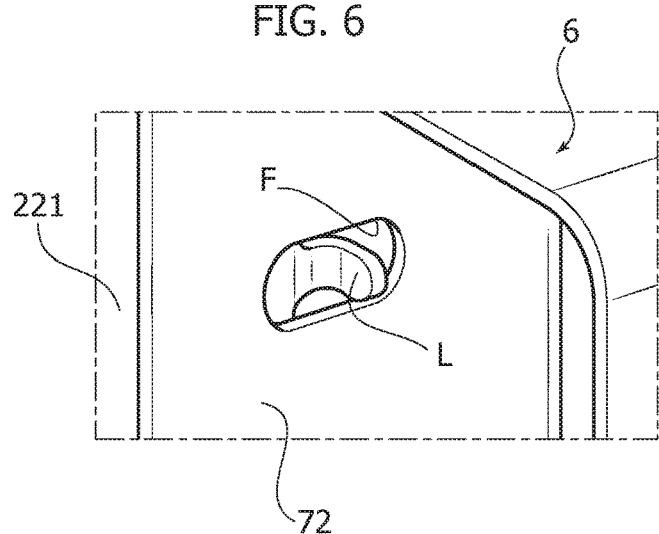
Figure 7:
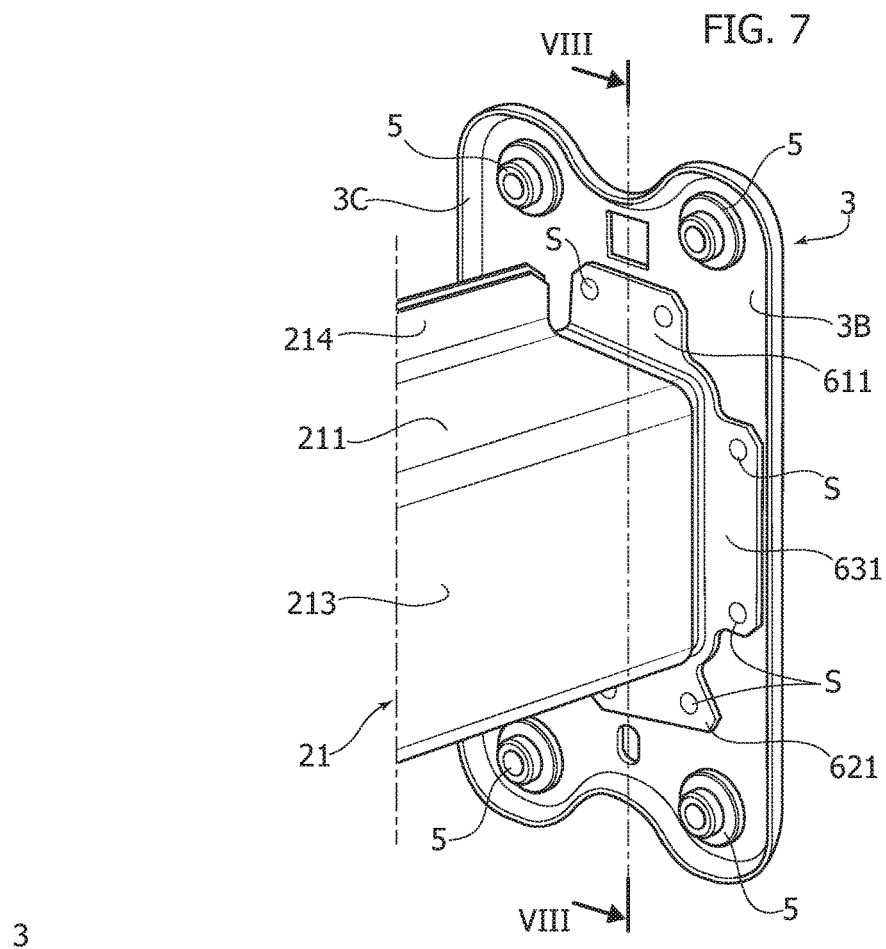
Figure 8:
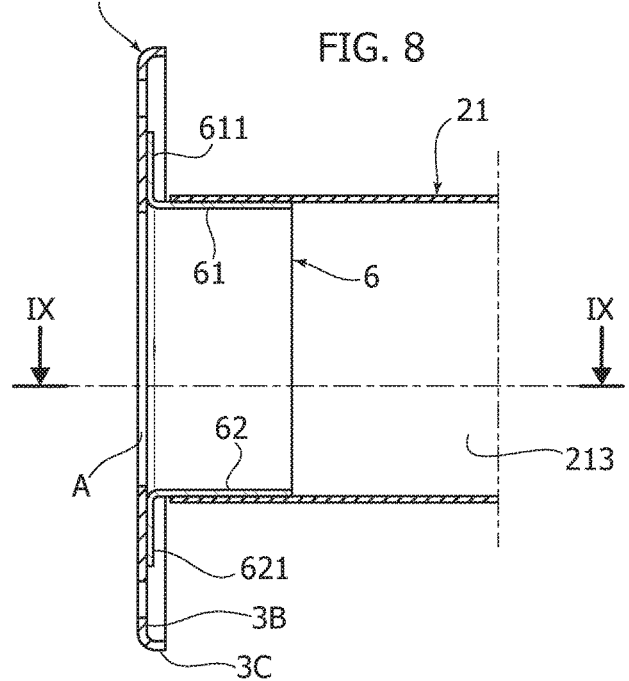
Figure 9:
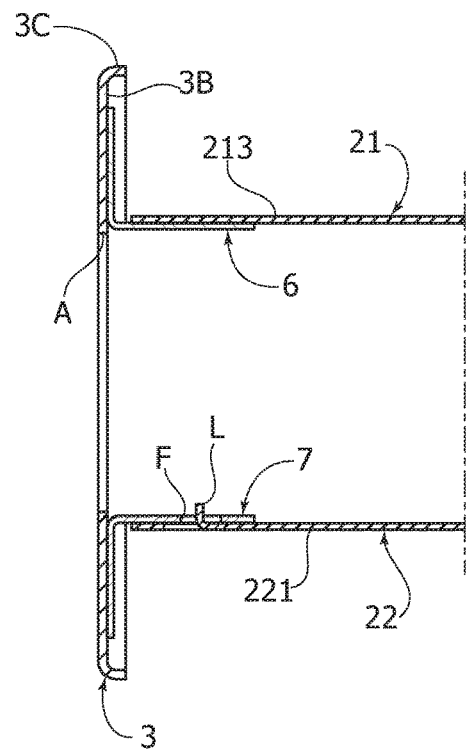
Figure 10:
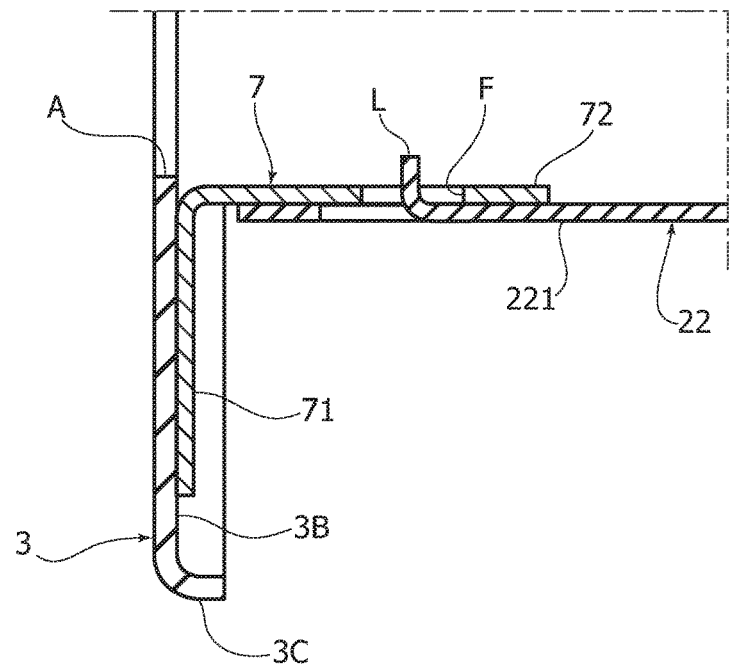
Figure 11:
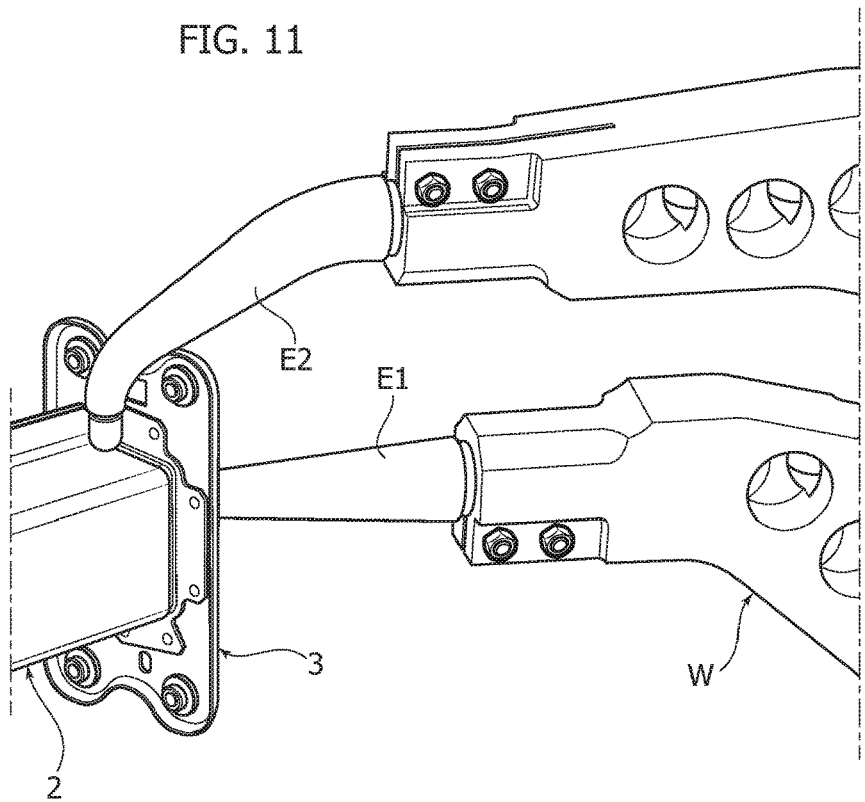
Figure 12:
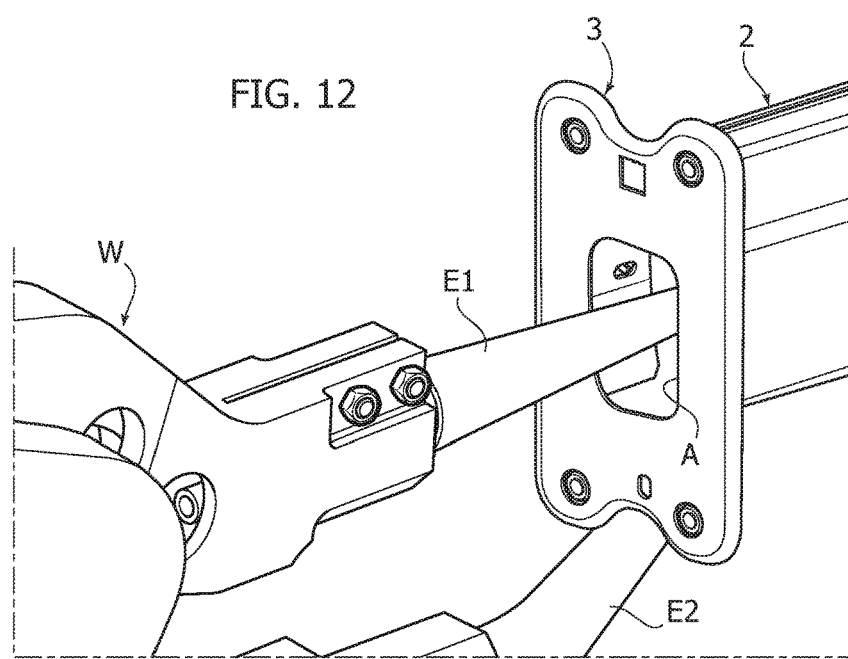

Further features and advantages of the invention will become readily apparent from the description which follows with reference to the annexed drawings, given purely by way of non-limiting example, in which:

FIG. 1 is a perspective view of a unit with longitudinal beam and front plate according to the present invention, FIGS. 2, 3 are two perspective views of the unit including the front plate with the first and second connecting flanges mounted to its rear face, FIG. 4 is a perspective view which shows one step of the method for manufacturing the structure of FIG. 1, FIG. 5 is a perspective view which shows a subsequent step of the method, FIG. 6 shows a detail of the structure of FIG. 5, shown from the inside of the longitudinal beam, FIG. 7 shows a further step of the manufacturing method, FIG. 8 is a view in cross-section taken along line VIII-VIII of FIG. 7, FIG. 9 is a view in cross-section along line IX-IX of FIG. 8, FIG. 10 is a view at an enlarged scale of a detail of figure IX, and FIGS. 11-13 are perspective views which show various steps of the method according to the invention.

In FIG. 1, reference numeral 1 generally designates a unit with longitudinal beam and front plate, comprising a longitudinal beam 2 and a front plate 3 rigidly connected to the front end of the longitudinal beam 2. The front structure of a motor-vehicle comprises a pair of units of the type shown in FIG. 1. The front plates 3 of the two units are used for connecting the ends of a front cross-member of the structure.

Between each end of the cross-member and respective front plate 3 there is typically interposed a so-called "crash box" structure, adapted to be deformed, so as to absorb impact energy, in case of a front impact of the motor-vehicle.

With reference to FIGS. 2, 3, the front plate 3 is constituted, in a manner known per se, of a planar plate, for example made of steel, having a front face 3A which in the mounted condition on the motor-vehicle faces forwardly and a rear face 3B, facing towards the longitudinal beam 2.

The longitudinal beam 2 is in the form of a hollow profile, with an upper wall, a lower wall and two side walls.

In the structure according to the invention, the longitudinal beam 2 is constituted by two longitudinal beam elements 21, 22 which are welded to each other, and for example are made of steel, or aluminium or aluminium alloys.

In the exemplary embodiment illustrated herein, the front plate 3 comprises a peripheral edge 3C projecting rearwardly from the plate so as to surround the rear face 3B. Also according to the prior art, in the front plate 3 holes 4 are formed for connection to a counter-plate carried by the respective "crash-box" structure (not shown here). In the form which is shown herein purely by way of example, on the rear face 3B of the front plate 3, at the holes 4 there are welded bushes 5 which are for receiving connecting screws (not shown).

The front plate 3 has a relatively large aperture A, which however is contained within the portion of the plate 3 enclosed between the two connecting flanges 6,7.

With reference in particular to FIGS. 4 and 7, the first beam element 21 is a longitudinal element with a C-shaped cross section, having an upper horizontal wall 211, a lower horizontal wall 212 and a vertical side wall 213 which define the upper wall, the lower wall and a first side wall of the longitudinal beam 2. Furthermore, in the embodiment shown herein, the two longitudinal edges of the longitudinal beam element 21 are bent upwardly and downwardly so as to define an upper longitudinal flange 214 and a lower longitudinal flange 215.

With reference to FIG. 5, the structure of the longitudinal beam 2 is completed by a second longitudinal beam element 22 which, in the example shown herein, has a single wall 221 which defines the second side wall of the longitudinal beam 2, opposite to the wall 213. The upper and lower longitudinal portions of the wall 221 are welded, as will be illustrated more in detail in the following, to the upper and lower flanges 214, 215 of the first beam element 21, so that the two beam elements 21, 22 define the longitudinal beam 2 in the form of a hollow profile, with a closed profile cross-section.

With reference again to FIGS. 2, 3, the front plate 3 is preliminary arranged with a first connecting flange 6 and a second connecting flange 7, which are separate from each other and welded to the rear face 3B of the front plate 3 and serving for connection of the front plate 3 to the front end of the longitudinal beam 2.

The first connecting flange 6 is in the form of a C-shaped bracket with an upper horizontal wall 61, a lower horizontal wall 62 and a side vertical wall 63. Each of these walls has an extension bent at 90°, welded to the rear face 3B of the front plate 3. In particular, the upper wall 61 of bracket 6 has an extension 611 welded for example by electric spot welds S to the rear face 3B of the front plate 3. The lower plate 62 of the bracket 6 has an extension 621, welded to the rear face 3B of the front plate 3, also in this case, for example by means of electric spot welds S. Finally, the side wall 63 of bracket 6 has an extension 631 welded for example by electric spot welds S to the rear face 3B of the front plate 3.

The second flange 7 is in the form of an L-shaped bracket with a first wall 71 connected to the rear face 3B of the front plate 3 for example by means of electric spot welds S. The L-shaped bracket 7 further comprises a second wall 72, arranged substantially at 90° with respect to the first wall 71. The second flange 7 is connected to the front plate 3 at a position such that the second wall 71 comes to be in a parallel and spaced apart position with respect to the side wall 63 of the first flange 6, facing the latter and arranged vertically in the same position. Also the vertical dimension of the wall 72 corresponds to that of wall 63 of the first flange 6, so that it comes to be in the space vertically limited between the upper and lower walls 61,62 of the first bracket 6. In the manufacturing method according to the invention, the front plate 3 is initially provided with the two connecting flanges 6,7, by means of welding, preferably by mean of electric spot welding, of the extensions 611, 621, 631 of the first flange 6 to the rear face 3B of the front plate 3 and by means of welding of the first wall 71 of the L-shaped flange 7 to said rear face 3B, again, according to the preferred embodiment, by means of spot electric welding.

With reference to FIG. 4, the subsequent step of the method includes the provision of the first longitudinal beam element 21 with one of its ends immediately adjacent to the rear face 3B of the front plate 3 and with its upper, lower and side walls arranged outside of, and in contact with, the cooperating walls of the first C-shaped flange 6.

The subsequent step of the method comprises providing the second longitudinal beam element 22 (see FIG. 5) in contact with the upper and lower flanges 214, 215 of the first beam element 21 and in contact with the second wall 72 of the second L-shaped flange 7. In this step, the beam element 22 is adjusted in position both with respect to the front plate 3 and with respect to the first beam element 21. This adjustment step is assisted by the engagement of a tab L, which is formed by cutting and bending of the wall 221 of the second beam element 22, within a slot F formed in the second wall 72 of the second bracket 7, this slot extending in a direction orthogonal to the plane of the front plate 3. The engagement of the tab L within slot F provides a first reference for positioning the second beam element 22 and defines stop ends for positioning the second beam element 22 in the longitudinal direction. Once also the second beam element 22 has been positioned correctly, the two beam elements 21, 22 are welded to each other, preferably by spot electric welds, along the upper and lower flanges 214, 215 of the first element 21 and the corresponding edge portions of the wall 221.

Once welding between the two beam elements 21, 22 is carried out, the beam 2 thus formed can be rigidly connected to the front plate 3 by means of welding to the two flanges 6,7. Preferably, welding is carried out by means of a plurality of electric spot welds which are performed with the aid of a spot electric welding head of the type partially shown in FIGS. 11-13 and designated by W. In these figures, the two electrodes of the welding head W are designated by E1, E2. FIGS. 11-13 show that the aperture A enables one of the two electrodes E1 to which the inner surface of flanges 6, 7 for performing the spot electric welds between the walls of the beam 2 and the flanges 6, 7. In particular, the upper horizontal wall 211 of the first beam element 21 is welded to the upper wall 61 of the C-shaped flange 6 (FIG. 11). Similarly, the lower wall 212 of the first beam element 21 is welded to the lower wall 62 of the C-shaped bracket 6 (FIG. 12). Similarly, the side wall 213 of the first beam element 21 is welded to the side wall 63 of the C-shaped bracket 6. Finally, the wall 221 of the second beam element 22 is welded to the second wall 72 of the L-shaped bracket 7 (FIG. 13).

As already indicated in the foregoing, a further important advantage of the present invention lies in that the first and second flanges 6,7 carried by the front plate 3 can be made, if this is preferred, also with metal sheets of different thickness. For example, in the preferred embodiment, the first C-shaped flange is arranged on a side of the beam facing towards the engine compartment and has a lower thickness with respect to the thickness of the second L-shaped flange. In this manner, in case of a front collision it can be obtained that the structure collapses in a preferred manner. As readily apparent from the foregoing description, the unit with longitudinal beam and front plate according to the invention and the associated manufacturing method provide appreciable improvements both with regards to simplicity of manufacture and with regard to reduction of manufacturing costs, and also with regard to the reliability of the connection and the ability of the structure thus obtained to absorb a collision in a correct manner.

Naturally, while the principle of the invention remains the same, the details of construction and the embodiments may widely vary with respect to what has been described purely by way of example, without departing from the scope of the present invention.

The invention claimed is:

1. Unit with longitudinal beam and front plate for a motor-vehicle front structure, comprising a longitudinal beam in the form of a hollow profile and a front plate rigidly connected to a front end of said longitudinal beam,
    said longitudinal beam comprises a first beam element defining an upper wall, a lower wall and a first side wall of the longitudinal beam and a second beam element having a wall defining a second side wall of the longitudinal beam,
    said front plate has a rear face facing towards the longitudinal beam to which a first flange and a second flange are welded, which are separate from each other for connection of the front end of the longitudinal beam,
    said first flange is a C-shaped bracket, with an upper wall, a lower wall and a side wall respectively welded to said upper wall, said lower wall and first side wall defined by said first beam element,
    the upper, lower and side walls of said first flange have respective bent extensions which are welded to the rear face (3B) of said front plate, and
    said second flange is a L-shaped bracket, with a first wall welded to the rear face of said front plate and a second wall welded to said second side wall defined by said second beam element.

2. Unit according to claim 1, wherein at least one of said first beam element and said second beam element has upper and lower longitudinal flanges welded to the other beam element.

3. Unit according to claim 1, wherein the two beam elements are arranged outside of said first and second flanges.

4. Unit according to claim 1, wherein said front plate has an aperture contained inside the area enclosed between said first and second flanges.

5. Unit according to claim 1, wherein said second wall of the second flange has at least one slot elongated in a direction orthogonal to a plane of the front plate adapted to loosely receive a bent tab of said second beam element.

6. Unit according to claim 1, wherein said first flange and said second flange are constituted by elements of metal sheet having identical thickness.

7. Unit according to claim 1, wherein said first flange and said second flange are constituted by elements of metal sheet having different thickness.

8. Unit according to claim 1, wherein said first C-shaped bracket is arranged on one side of the beam which is to be facing towards the engine compartment of the motor-vehicle and is constituted by elements of metal sheet having a lower thickness than that of said L-shaped bracket.

9. Method for assembling a unit with longitudinal beam and front plate according to claim 1, wherein it comprises the following steps:
    providing said front plate with said first flange and said second flange welded to the rear face thereof,
    positioning said first beam element with one of its ends adjacent to the rear face of the front plate and with its upper, lower and side walls in contact with the outer surfaces of said upper, lower and side walls of said first C-shaped bracket, positioning said second beam element with one of its ends adjacent to the rear face of the front plate and its wall in contact with the outer surface of said second wall of said second L-shaped bracket, and adjusting the position of said second beam element with respect to said front plate and with respect to said first beam element along a direction orthogonal to the front plate, welding said first and second beam element to each other, and welding the upper, lower and side walls of said first beam element to the upper, lower and side walls of said first flange and welding the wall of said second beam element to said second wall of the second flange.

10. Method according to claim 9, wherein said welding operations are all made by spot electric welds.

11. Method according to claim 10, wherein said front plate has an aperture contained inside the area enclosed between the first and second flanges and sufficiently large for enabling one electrode of a spot electric welding head to reach the inner surface of the walls of said first and second flanges.

* * * * *